United States Patent
Ladd (10) Patent No.: US 12,037,010 B2
(45) Date of Patent: *Jul. 16, 2024

(54) SYSTEM AND METHOD FOR NEURAL NETWORK-BASED AUTONOMOUS DRIVING

(71) Applicant: Marvell Asia Pte, Ltd., Singapore (SG)

(72) Inventor: William Knox Ladd, Raleigh, NC (US)

(73) Assignee: Marvell Asia Pte, Ltd., Singapore (SG)

( * ) Notice: Subject to any disclaimer, the term of this patent is extended or adjusted under 35 U.S.C. 154(b) by 92 days.

This patent is subject to a terminal disclaimer.

(21) Appl. No.: 18/050,788

(22) Filed: Oct. 28, 2022

(65) Prior Publication Data

US 2023/0078599 A1    Mar. 16, 2023

Related U.S. Application Data

(63) Continuation of application No. 17/073,860, filed on Oct. 19, 2020, now Pat. No. 11,511,770.

(51) Int. Cl.
*B60W 50/00* (2006.01)
*B60W 60/00* (2020.01)
(Continued)

(52) U.S. Cl.
CPC .......... *B60W 60/001* (2020.02); *B60W 40/11* (2013.01); *B60W 40/112* (2013.01); *B60W 40/114* (2013.01); *B60W 50/045* (2013.01); *G06N 3/04* (2013.01); *G06N 3/08* (2013.01); *B60W 2420/40* (2013.01);
(Continued)

(58) Field of Classification Search
CPC .. B60W 60/001; B60W 40/11; B60W 40/112; B60W 40/114; B60W 50/045; B60W 2420/40; B60W 2420/42; B60W 2420/52; B60W 2420/54; B60W 2520/14;
(Continued)

(56) References Cited

U.S. PATENT DOCUMENTS 10,095,230 B1   10/2018  Hardin
10,101,745 B1   10/2018  Sun et al.
(Continued)

OTHER PUBLICATIONS

Stewart, Jack; "Driverless Cars Need Ears as Well as Eyes"; Wired.com; Aug. 21, 2017; https://www.wired.com/story/driverless-cars-need-ears-as-well-as-eyes/.

*Primary Examiner* — Tiffany P Ohman
(74) *Attorney, Agent, or Firm* — Hamilton, Brook, Smith & Reynolds, P.C.

(57) ABSTRACT

A system and corresponding method for autonomous driving of a vehicle are provided. The system comprises at least one neural network (NN) that generates at least one output for controlling the autonomous driving. The system further comprises a main data path that routes bulk sensor data to the at least one NN and a low-latency data path with reduced latency relative to the main data path. The low-latency data path routes limited sensor data to the at least one NN which, in turn, employs the limited sensor data to improve performance of the at least one NN's processing of the bulk sensor data for generating the at least one output. Improving performance of the at least one NN's processing of the bulk sensor data enables the system to, for example, identify a safety hazard sooner, enabling the autonomous driving to divert the vehicle and avoid contact with the safety hazard.

33 Claims, 6 Drawing Sheets

(51) Int. Cl.
*B60W 40/11* (2012.01)
*B60W 40/112* (2012.01)
*B60W 40/114* (2012.01)
*B60W 50/04* (2006.01)
*G06N 3/04* (2023.01)
*G06N 3/08* (2023.01)

(52) U.S. Cl.
CPC ..... *B60W 2420/42* (2013.01); *B60W 2420/52* (2013.01); *B60W 2420/54* (2013.01); *B60W 2520/14* (2013.01); *B60W 2520/16* (2013.01); *B60W 2520/18* (2013.01)

(58) Field of Classification Search
CPC .................... B60W 2520/16; B60W 2520/18; G06N 3/04; G06N 3/08
USPC ......................................................... 701/27
See application file for complete search history.

(56) References Cited

U.S. PATENT DOCUMENTS

| | | |
|---|---|---|
| 10,599,150 B2 | 3/2020 | Graham et al. |
| 11,511,770 B2 | 11/2022 | Ladd |
| 2017/0135621 A1 | 5/2017 | Lee et al. |
| 2018/0299841 A1 | 10/2018 | Appu et al. |
| 2018/0348343 A1 | 12/2018 | Achour et al. |
| 2019/0145765 A1 | 5/2019 | Luo et al. |
| 2019/0291720 A1 | 9/2019 | Xiao et al. |
| 2019/0332109 A1 | 10/2019 | Kolouri et al. |
| 2019/0375425 A1 | 12/2019 | Harrison |
| 2020/0252682 A1 | 8/2020 | Walker |
| 2022/0119002 A1 | 4/2022 | Ladd |

SYSTEM AND METHOD FOR NEURAL NETWORK-BASED AUTONOMOUS DRIVING

RELATED APPLICATIONS

This application is a continuation of U.S. application Ser. No. 17/073,860, filed Oct. 19, 2020, now U.S. Pat. No. 11,511,770, issued on Nov. 29, 2022. The entire teachings of the above application are incorporated herein by reference.

BACKGROUND

An autonomous vehicle is a vehicle that is capable of sensing its environment and navigating with little or no user input. An autonomous vehicle detects its environment using sensor devices, such as cameras, ranging (e.g., radar, lidar, etc.) sensors, etc. An autonomous vehicle may also use information from positioning systems, such as but not limited to a global positioning system (GPS), navigation systems, vehicle-to-vehicle communications, vehicle infrastructure technologies and/or wireline systems to navigate the vehicle, that is, to perform the autonomous driving.

Autonomous driving has moved quickly from the realm of science fiction to becoming an achievable reality. Advanced Driver-Assistance Systems ("ADAS") exist that attempt to automate, adapt, and enhance vehicles for safety and better driving. Vehicles are increasingly assuming control of driving functions, such as steering, accelerating, and braking, and such autonomous vehicles need to monitor the surrounding environment and driving conditions to respond to events, such as by changing lanes or accelerating/decelerating as needed to avoid traffic, crossing pedestrians, animals, and so on.

SUMMARY

According to an example embodiment, a system for autonomous driving comprises at least one neural network (NN) configured to generate at least one output used to control the autonomous driving. The system further comprises a main data path configured to route bulk sensor data to the at least one NN and a low-latency data path with reduced latency relative to the main data path. The low-latency data path is configured to route limited sensor data to the at least one NN which is configured to, in turn, employ the limited sensor data to improve performance of the at least one NN's processing of the bulk sensor data for generating the at least one output.

The limited sensor data may be of a lesser amount relative to the bulk sensor data, coarser relative to the bulk sensor data, or a combination thereof.

The limited sensor data may enable the at least one NN to generate the at least one output sooner or with improved accuracy relative to generating the at least one output based on processing the bulk sensor data without processing the limited sensor data received via the low-latency data path ahead of the bulk sensor data.

The limited sensor data may include radio detection and ranging (radar) data, light detection and ranging (lidar) data, image data, audio data, tactile data, or a combination thereof, sourced by at least one sensor and related to an environment of a vehicle, the vehicle controlled by the autonomous driving. It should be understood, however, that the limited sensor data is not limited to including radar data, lidar data, image data, audio data, tactile data, or a combination thereof.

At least a portion of the bulk sensor data, limited sensor data, or a combination thereof, may be sourced by a radar sensor, lidar sensor, sound navigation and ranging (sonar) sensor, ultrasonic transducer, camera, infrared sensor, pitch sensor, roll sensor, yaw sensor, altitude sensor, heading sensor, positioning system, such as a global positioning system (GPS) but not limited thereto, accelerometer, velocity sensor, microphone, or a combination thereof. It should be understood, however, that the at least a portion of the bulk sensor data, limited sensor data, or a combination thereof is not limited to being sourced by any one of the above-noted sensors or combination thereof.

The system may further comprise an inference engine and a decision-making engine. The inference engine may include the at least one NN. The at least one output may be output from the at least one NN of the inference engine to the decision-making engine.

The decision-making engine may be configured to make at least one decision for controlling the autonomous driving based on the at least one output generated.

The main data path may include at least one dynamic random-access memory (DRAM) configured to store the bulk sensor data before the bulk sensor data is routed to the at least one NN.

The main data path may further include at least one processing circuit configured to process the bulk sensor data before the bulk sensor data is stored in the at least one DRAM.

The at least one processing circuit may be at least one first processing circuit. The main data path may further include at least one second processing circuit. The at least one second processing circuit may be disposed between the at least one DRAM and the at least one NN. The at least one second processing circuit may be configured to process the bulk sensor data, filter the bulk sensor data, or a combination thereof, before the bulk sensor data is routed from the at least one DRAM to the at least one NN.

The low-latency data path may include at least one static random-access memory (SRAM) configured to store the limited sensor data before the limited sensor data is routed to the at least one NN. It should be understood that the at least one SRAM is not limited to being an SRAM chip(s) and may be implemented in a variety of ways. For example, according to a non-limiting example embodiment, the at least one SRAM may be implemented via multiple flip-flops (FFs) or other SRAM logic/circuit(s) integrated together with the at least one NN on an application-specific integrated circuit (ASIC).

The at least one NN may include at least one first NN and at least one second NN. The main data path may be configured to route the bulk sensor data to the at least one first NN. The low-latency data path may be configured to route the limited sensor data to the at least one second NN.

The at least one second NN may be smaller and may execute faster relative to the at least one first NN.

The low-latency data path may include at least one SRAM configured to store the limited sensor data before the limited sensor data is routed to the at least one second NN.

An output layer of the at least one second NN may be coupled to an input layer of the at least one first NN to provide processing feedback from the output layer of the at least one second NN to the input layer of the at least one first NN.

The at least one output may include at least one first output and at least one second output. The at least one NN may be configured to generate the at least one first output. The at least one second NN may be configured to generate the at least one second output. The at least one second output may be used for controlling the autonomous driving or to effect a change to at least one parameter that controls at least one sensor sourcing at least a portion of the bulk sensor data.

According to another example embodiment, a method for autonomous driving comprises generating, by at least one neural network (NN), at least one output used for controlling the autonomous driving. The method further comprises employing limited sensor data received via a low-latency data path to improve performance of the at least one NN's processing of bulk sensor data for generating the at least one output. The bulk sensor data is routed to the at least one NN via a main data path. The limited sensor data is routed to the at least one NN via the low-latency data path with reduced latency relative to the main data path.

Alternative method embodiments parallel those described above in connection with the example system embodiment.

According to another example embodiment, a non-transitory computer-readable medium for autonomous driving may have encoded thereon a sequence of instructions which, when loaded and executed by at least one processor, causes the at least one processor to implement at least one neural network (NN) that is configured to generate at least one output used for controlling the autonomous driving. The at least one NN is further configured to employ limited sensor data received via a low-latency data path to improve performance of the at least one NN's processing of bulk sensor data for generating the at least one output. The bulk sensor data is routed to the at least one NN via a main data path. The limited sensor data is routed to the at least one NN via the low-latency data path with reduced latency relative to the main data path.

Alternative non-transitory computer-readable medium embodiments parallel those described above in connection with the example system embodiment.

According to yet another example embodiment, a system for autonomous driving comprises means for performing neural network processing to generate at least one output for controlling the autonomous driving, means for routing bulk sensor data for the neural network processing, and means for routing limited sensor data with reduced latency relative to the routing of the bulk sensor data. The performing includes employing the limited sensor data to improve performance of the neural network processing of the bulk sensor data for generating the at least one output.

It should be understood that example embodiments disclosed herein can be implemented in the form of a method, apparatus, system, or computer readable medium with program codes embodied thereon.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

It should be understood that while an autonomous vehicle may be shown and described herein as a self-driving car, example embodiments of an autonomous vehicle or autonomous driving disclosed herein are not limited to a self-driving car or autonomous driving thereof. For example, an autonomous vehicle may be an autonomous aircraft, autonomous ship, autonomous underwater vehicle, autonomous spacecraft, autonomous device, etc.

A challenge of autonomous driving is for the autonomous vehicle to detect and classify objects in its surrounding environment as well as or better than a human. Humans are adept at recognizing and perceiving the world around them with an extremely complex human visual and audio system that includes the following functional parts: the eye, ear, and brain. In autonomous driving technologies, the eye and ear may include a combination of multiple sensors, such as camera, radar, and lidar sensors, the ear may include microphones, while the brain may involve multiple artificial intelligence, machine learning, and deep learning systems. A goal for autonomous driving is to have full understanding of a dynamic, fast-moving environment in real-time and human-like intelligence to act in response to changes in the environment, such as the environment 90 of the autonomous vehicle 95 of FIG. 1A, disclosed below.

Figure 1A:
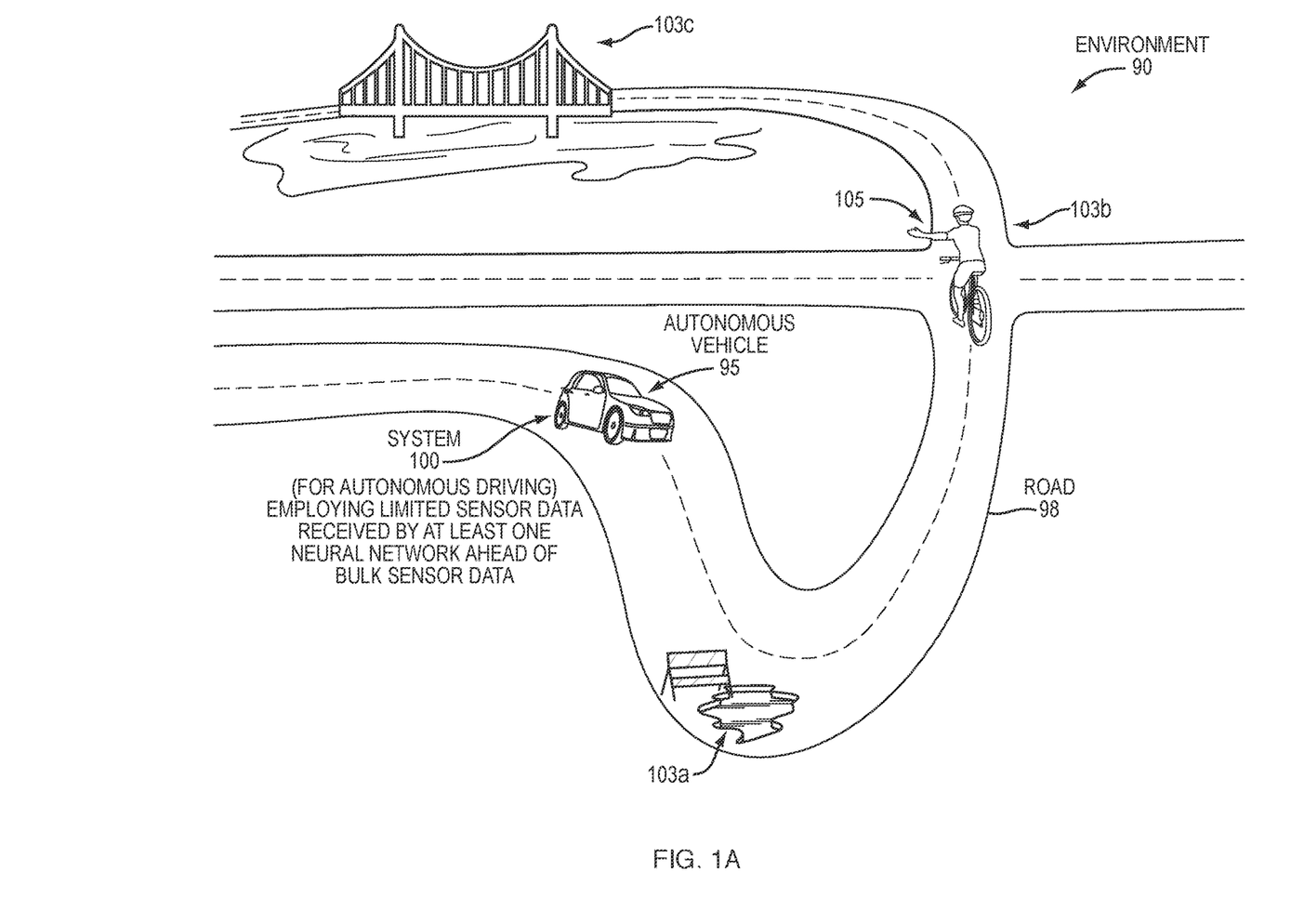
FIG. 1A is a block diagram of an example embodiment of an environment in which an autonomous vehicle is being driven by a system for autonomous driving.

FIG. 1A is a block diagram of an example embodiment of an environment 90 within which an autonomous vehicle 95 is driving. In the example embodiment, the autonomous vehicle 95 is a self-driving car. It should be understood, however, that an example embodiment of an autonomous vehicle is not limited to a self-driving car. The autonomous vehicle 95 is being driven by a system 100 for autonomous driving. The system 100 employs sensors (not shown) to collect sensor data. The sensors may be co-located or geographically dispersed. A portion of the sensors may be at a remote location relative to the autonomous vehicle 95 or mounted to the autonomous vehicle 95, or integrated as part of a structure of the autonomous vehicle 95.

In general, the sensors are employed to collect sensor data with respect to the environment 90 of the autonomous vehicle 95 as well as status of the autonomous vehicle 95 itself. It should be understood that sensor data may be collected off-vehicle and received by the autonomous vehicle 95 via a wireless connection. Such off-vehicle sensor data may be collected by another vehicle (not shown) or provided by a server (not shown). The system 100 provides for control of various actions of the autonomous vehicle 95 (e.g., steering, acceleration, deceleration, etc.) based on the sensor data. The system 100 may employ the sensor data to detect objects in the environment 90 and may base control of various actions of the autonomous vehicle 95 on same.

Such objects may include but are not limited to structural elements in the environment, such as roads, walls, buildings, road center medians, road defects, bridges, tunnels, etc., and other objects, such as vehicles, pedestrians, bystanders, cyclists, plants, trees, animals, etc. Control of the various actions may be based on perception of a characteristic(s) of such objects, such as shape, dimension(s), orientation, proximity, texture (e.g., smooth, rough, wet, dry, icy, etc.), eye-gaze, speed, acceleration/deceleration, etc. and/or characteristic(s) of the environment 90 itself, such as a visibility level, weather condition, etc.

For example, the system 100 may employ such sensor data to detect the pothole 103a in the road 98 causing the system 100 to maneuver the autonomous vehicle 95 in a manner that avoids contact with same. The system 100 may employ such sensor data to detect the bicyclist 103b and predict that the bicyclist 103b will cross a path of the autonomous vehicle 95 by further detecting the left-hand turn signal 105 made by the bicyclist 103b. In response to such detection, the system 100 may make a decision to slow down the autonomous vehicle 95 to avoid contact with same. The system 100 may further employ such sensor data to detect the bridge 103c and may reduce a speed of the autonomous vehicle 95 as the autonomous vehicle 95 approaches the bridge 103c. Such reduction in speed may be due to a prediction made by the system 100 that a terrain of the bridge 103c is likely to be rough.

Detection of such objects may be performed by at least one neural network (NN), such as the at least one NN 102 of FIG. 1B, disclosed further below, that receives the sensor data collected. According to an example embodiment, performance of the at least one NN is improved by employing a low-latency data path for limited sensor data to the at least one NN and a main data path for bulk sensor data to the at least one NN. The limited sensor data arrives at the at least one NN ahead of the bulk sensor data to improve response of the system 100 overall, such as disclosed below with regard to FIG. 1B.

Figure 1B:
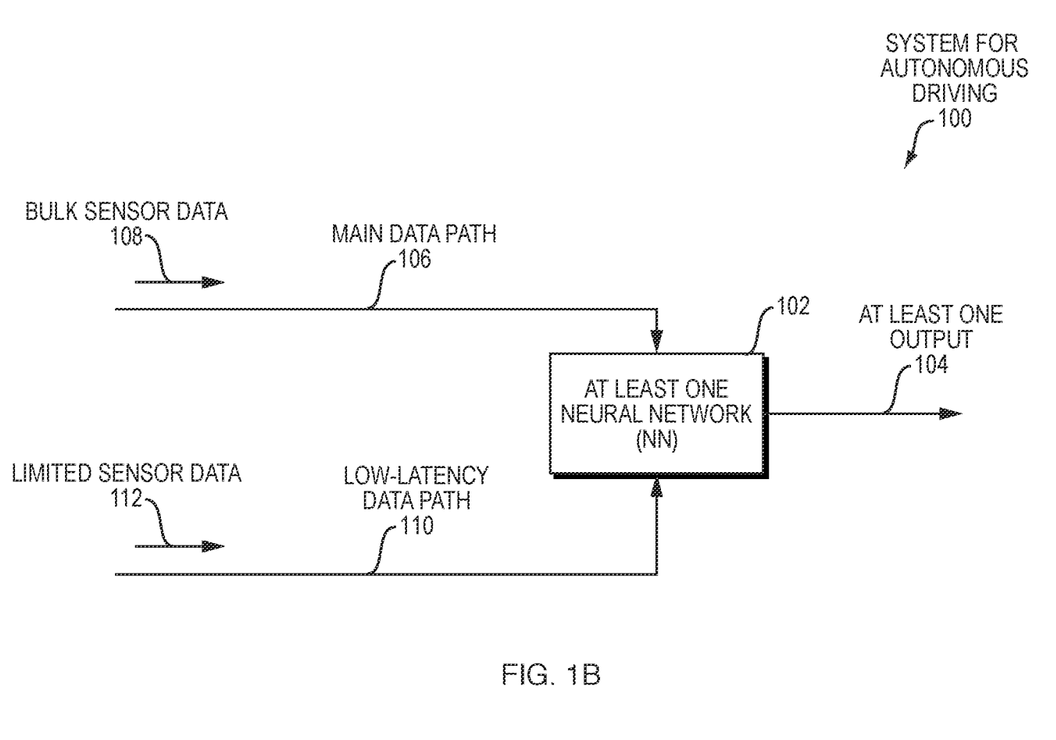
FIG. 1B is a block diagram of an example embodiment of the system of FIG. 1A.

FIG. 1B is a block diagram of an example embodiment of the system 100 of FIG. 1A. The system 100 comprises at least one neural network (NN) 102 configured to generate at least one output 104 used to control the autonomous driving. The at least one NN 102 may be a convolutional neural network (CNN), recurrent neural network (RNN), or combination thereof. It should be understood that the at least one NN 102 is not limited to a CNN, RNN, or combination thereof, and may be any suitable artificial neural network (ANN) or combination of neural networks.

According to the example embodiment, the system 100 further comprises a main data path 106 configured to route bulk sensor data 108 to the at least one NN 102 and a low-latency data path 110 with reduced latency relative to the main data path 106. The low-latency data path 110 is configured to route limited sensor data 112 to the at least one NN 102 which is configured to, in turn, employ the limited sensor data 112 to improve performance of the at least one NN's processing of the bulk sensor data 108 for generating the at least one output 104, thereby improving a response of the system 100 to events in its environment 90. According to an example embodiment, the at least one output 104 may represent a decision for controlling the autonomous driving. Alternatively, the at least one output 104 may be transmitted to another learning system (not shown) that may make the decision for controlling the autonomous driving.

The limited sensor data 112 is provided to the at least one NN 102 ahead of the bulk sensor data 108 to improve the response and decision making of the at least one NN 102. The limited sensor data 112 may be used to refine a direction of image capture in order to focus on an object with greater detail, that is, with increased resolution, and may accelerate the processing of such higher resolution image data. It should be understood, however, that the limited sensor data 112 is not limited to image data. For a non-limiting example and with reference to FIG. 1A, the higher resolution data may enable the system 100 to discern if a person (not shown) near the road 98 or driving another vehicle (not shown) is paying attention or making eye contact with the autonomous vehicle 95 to assess a risk of collision and may adjust, for example, a speed of the autonomous vehicle 95 based on the risk assessed.

The limited sensor data 112 may be considered limited relative to the bulk sensor data 108 because the limited sensor data 112 may be restricted to be of a lesser amount relative to the bulk sensor data 108 or may be of a courser granularity relative to a finer granularity of the bulk sensor data 108. According to an example embodiment, the limited sensor data 112 may be sensor data that has been identified as higher priority (e.g., more important) sensor data relative to other sensor data that is included in the bulk sensor data 108. According to an example embodiment, the limited sensor data 112 may be sourced by a subset of sensors that source the bulk sensor data 108. It should be understood, however, that the limited sensor data 112 may be sourced by sensors that do not source sensor data of the bulk sensor data 108. According to an example embodiment, the limited sensor data 112 may be considered limited because a number of sensor readings (e.g., measurements) included in same is less over a given time period relative to a number of sensor readings of the bulk sensor data 108 over the given time period. It should be understood, however, that the limited sensor data 112 and bulk sensor data 108 are not limited to any of the characteristics noted above.

Referring back to FIG. 1B, the limited sensor data 112 may be a reduced set of sensor data relative to the bulk sensor data 108. Processing of the bulk sensor data 108 may be computationally intensive and time consuming whereas processing of the limited sensor data 112 may require less computational cycles and processing time relative to same. Such rapid processing of the limited sensor data 112 may enable the at least one NN 102 to prioritize a first portion of sensor data of the bulk sensor data 108 for processing ahead of a second portion of the bulk sensor data 108 to reduce an amount of time taken to generate the at least one output 104 that may be used by the system 100 to, for example, ultimately avoid an obstacle in a path of the autonomous vehicle, such as the autonomous vehicle 95 of FIG. 1A, disclosed above.

According to an example embodiment, the limited sensor data 112 that is processed by the at least one NN 102 ahead of the bulk sensor data 108 may enable the at least one NN 102 to make a decision, represented by the at least one output 104, that causes the system to adjust a parameter of a sensor that generates sensor data of the bulk sensor data 108. For a non-limiting example with reference to FIGS. 1A and 1B, the limited sensor data 112 may include image data whereas the bulk sensor data 108 may include the image data as well as radar data. By receiving the limited sensor data 112 ahead of the bulk sensor data 108, the at least one NN 102 may detect the bicyclist 103b sooner and make a decision to increase resolution of a camera capturing the image data such that the at least one NN 102 is able to determine that the bicyclist 103b is providing the left-hand turn signal 105, ultimately causing the system 100 to react sooner in response to same.

For another non-limiting example, the limited sensor data 112 may be radar data and the bulk sensor data 108 may include the radar data as well as other sensor data. The limited sensor data 112 arrives at the at least one NN 102 ahead of the bulk sensor data 108 and may cause the at least one NN 102 to make a decision to adjust, for example, a radio frequency (RF) beam transmitted to detect objects.

Such adjusting may enable the system to detect the bicyclist 103b sooner and avoid contact with same.

Referring back to FIG. 1B, according to an example embodiment, the at least one NN 102 includes at least one deep NN, that is, an artificial neural network with multiple layers between the input and output layers. The at least one NN 102 may be trained using at least one training dataset (not shown). The at least one training dataset may include a known training dataset for autonomous driving, such as the Astyx Dataset HiRes2019 automotive radar dataset, Berkeley DeepDrive dataset, Level 5 dataset, other known training dataset for autonomous driving, custom training dataset, or a combination thereof.

With reference to FIGS. 1A and 1B, the system 100 may be operated in a training mode or an operational mode. In the training mode, the at least one NN 102 may be trained. For example, the system 100 may be deployed in the autonomous vehicle 95 which, while autonomous, may be operated by a human driver while in the training mode. Once the at least one NN 102 is trained, the autonomous vehicle 95 may be operated in an autonomous manner (without a human driver). The at least one NN 102 may be trained to generate a digital map of an environment of an autonomous vehicle, such as the environment 90 of the autonomous vehicle 95, and to classify and label objects in the environment 90. The at least one output 104 may represent an object classified and labelled, a characteristic of an object classified and labelled, or a recommended action for controlling the autonomous vehicle based on the object classified and labelled.

One of the problems that occur during neural network training is overfitting. With overfitting, the error on the training set is driven to a very small value, but when new data is presented to the neural network the error is large. The neural network has memorized the training examples, but it has not learned to generalize to new situations. According to an example embodiment, providing the limited sensor data 112 ahead of the bulk sensor data 108 may prevent such overfitting of the at least one NN 102.

The limited sensor data 112 may be of a lesser amount relative to the bulk sensor data 108, coarser relative to the bulk sensor data 108, or a combination thereof. The limited sensor data 112 may enable the at least one NN 102 to generate the at least one output 104 sooner or with improved accuracy relative to generating the at least one output 104 based on processing the bulk sensor data 108 without processing the limited sensor data 112 received via the low-latency data path 110 ahead of the bulk sensor data 108.

The limited sensor data 112 may include radar data, lidar data, image data, audio data, tactile data, or a combination thereof, sourced by at least one sensor (not shown) and related to the environment 90 of the autonomous vehicle 95 that is controlled by the autonomous driving. It should be understood, however, that the limited sensor data 112 is not limited to including radar data, lidar data, image data, audio data, tactile data sourced by at least one tactile sensor, or a combination thereof. For example, the limited sensor data 112 may include wheel slip of the autonomous vehicle 95, speed thereof, wind speed of the environment 90, temperature thereof, etc. The system 100 may further comprise an inference engine and a decision-making engine, such as the inference engine 228 and decision-making engine 224 of FIG. 2, disclosed below.

Figure 2:
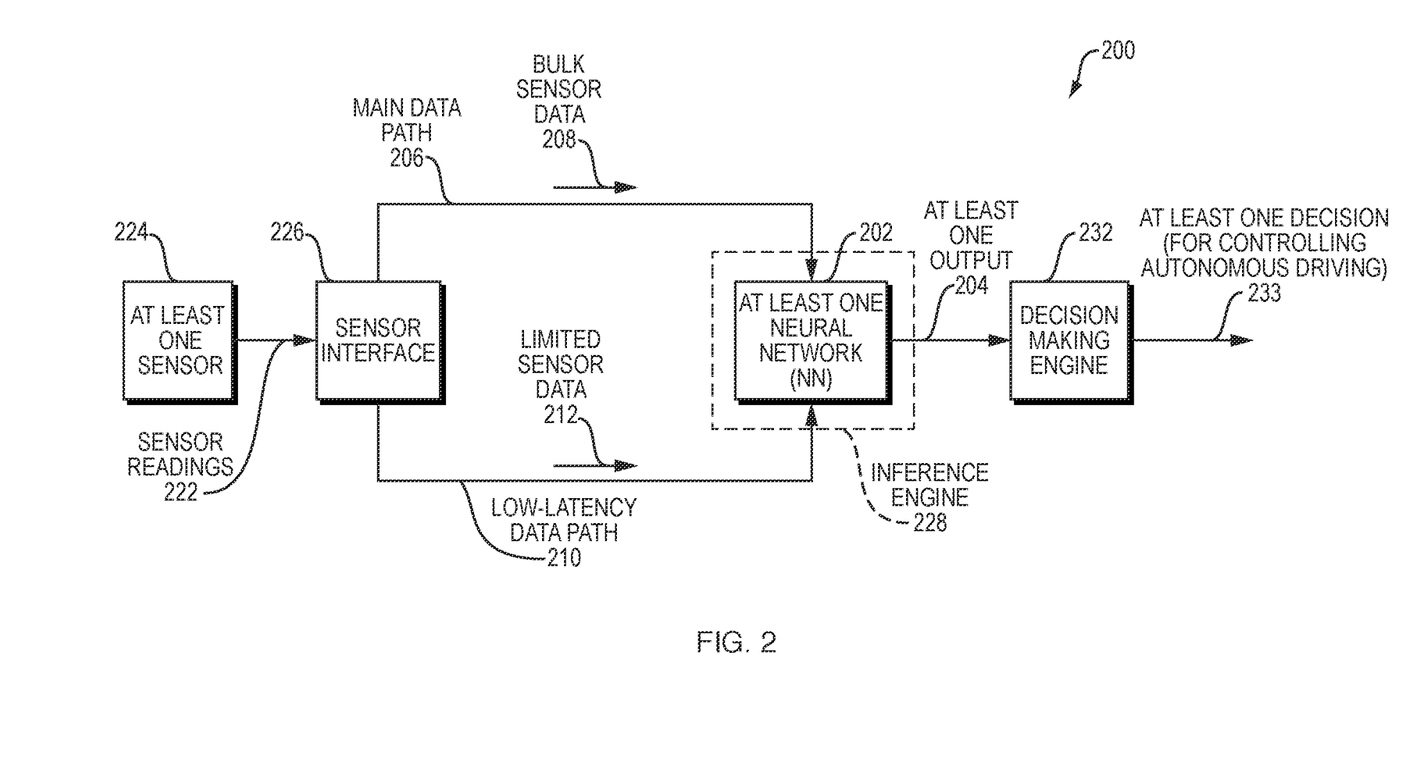
FIG. 2 is a block diagram of an example embodiment of a system for autonomous driving.

FIG. 2 is a block diagram of an example embodiment of a system 200 for autonomous driving that may be employed as the system 100 of FIGS. 1A and 1B, disclosed above. The system 200 comprises at least one NN 202 that is configured to generate at least one output 204 used to control the autonomous driving. The system 200 further comprises a main data path 206 configured to route bulk sensor data 208 to the at least one NN 202 and a low-latency data path 210 with reduced latency relative to the main data path 206. The low-latency data path 210 is configured to route limited sensor data 212 to the at least one NN 202 which is configured to, in turn, employ the limited sensor data 212 to improve performance of the at least one NN's processing of the bulk sensor data 208 for generating the at least one output 204.

The system 200 receives sensor readings 222 from at least one sensor 224 via a sensor interface 226 that, in turn, provides the bulk sensor data 208 and limited sensor data 212 therefrom. It should be understood that the sensor interface 226 may include multiple sensor interfaces and that the bulk sensor data 208 and limited sensor data 212 need not be produced from a single sensor interface or the same sensor interface. The sensor interface 226 may include at least one sensor interface chip (not shown) that is configured to interface with the at least one sensor 224 to collect the sensor readings 222 from the at least one sensor 224 and output the bulk sensor data 208 and limited sensor data 212 therefrom.

It should be understood, however, that the sensor interface 226 is not limited to including at least one sensor interface chip and may be any suitable interface implemented in hardware, firmware, software, or any combination thereof, that is capable of communicating with the at least one sensor 224, another sensor system (not shown), or a combination thereof, to collect the sensor readings 222, select the bulk sensor data 208 and limited sensor data 212 therefrom, and transmit the bulk sensor data 208 and limited sensor data 212 to the at least one NN 202 via the main data path 206 and low-latency data path 210, respectively. Such selection may be performed by a hardware filter(s) by way of a non-limiting example.

The at least one sensor 224 may include a radio detection and ranging (radar) sensor, light detection and ranging (lidar) sensor, sound navigation and ranging (sonar) sensor, ultrasonic transducer, camera, infrared sensor, pitch sensor, roll sensor, yaw sensor, altitude sensor, heading sensor, positioning system, such as a global positioning system (GPS) but not limited thereto, accelerometer, velocity sensor, microphone, or a combination thereof. It should be understood, however, that the at least one sensor 224 is not limited thereto.

At least a portion of the bulk sensor data 208, limited sensor data 212, or a combination thereof, may be sourced by the radar sensor, lidar sensor, sonar sensor, ultrasonic transducer, camera, infrared sensor, pitch sensor, roll sensor, yaw sensor, altitude sensor, heading sensor, roll sensor, positioning system, such as a GPS but not limited thereto, accelerometer, velocity sensor, microphone, or a combination thereof. It should be understood, however, that the at least a portion of the bulk sensor data 208, limited sensor data 212, or a combination thereof is not limited to being sourced by any one of the above-noted sensors or combination thereof.

The system 200 further comprises an inference engine 228 and a decision-making engine 232. The inference engine 228 includes the at least one NN 202. The at least one NN 202 may be an artificial intelligence system that reasons about a set of rules in a rule base (not shown) and implements rules based on information stored in a fact base (not shown). The fact base is a list of known facts that the at least one NN 202 stores. The at least one NN 202 can perform such reasoning with a forward-chaining or back-chaining approach. The at least one NN 202 can implement the rules that it reasons about to create the at least one output 204 transmitted from the inference engine 228.

The at least one output 204 is output from the at least one NN 202 of the inference engine 228 to the decision-making engine 232. The decision-making engine 232 may be configured to make at least one decision 233 for controlling the autonomous driving based on the at least one output 204 that is generated. Alternatively, the at least one decision-making engine 232 may be configured to adjust a parameter of the system 100 based on the at least one output 204. For example, the at least one decision-making engine may adjust a parameter that controls an infrared light to highlight an area in a field of view of a camera or to change the field of view.

As disclosed above, the low-latency data path 210 has reduced latency relative to the main data path 206. According to an example embodiment, the main data path 206 may include at least one dynamic random-access memory (DRAM), such as disclosed below with regard to FIG. 3.

Figure 3:
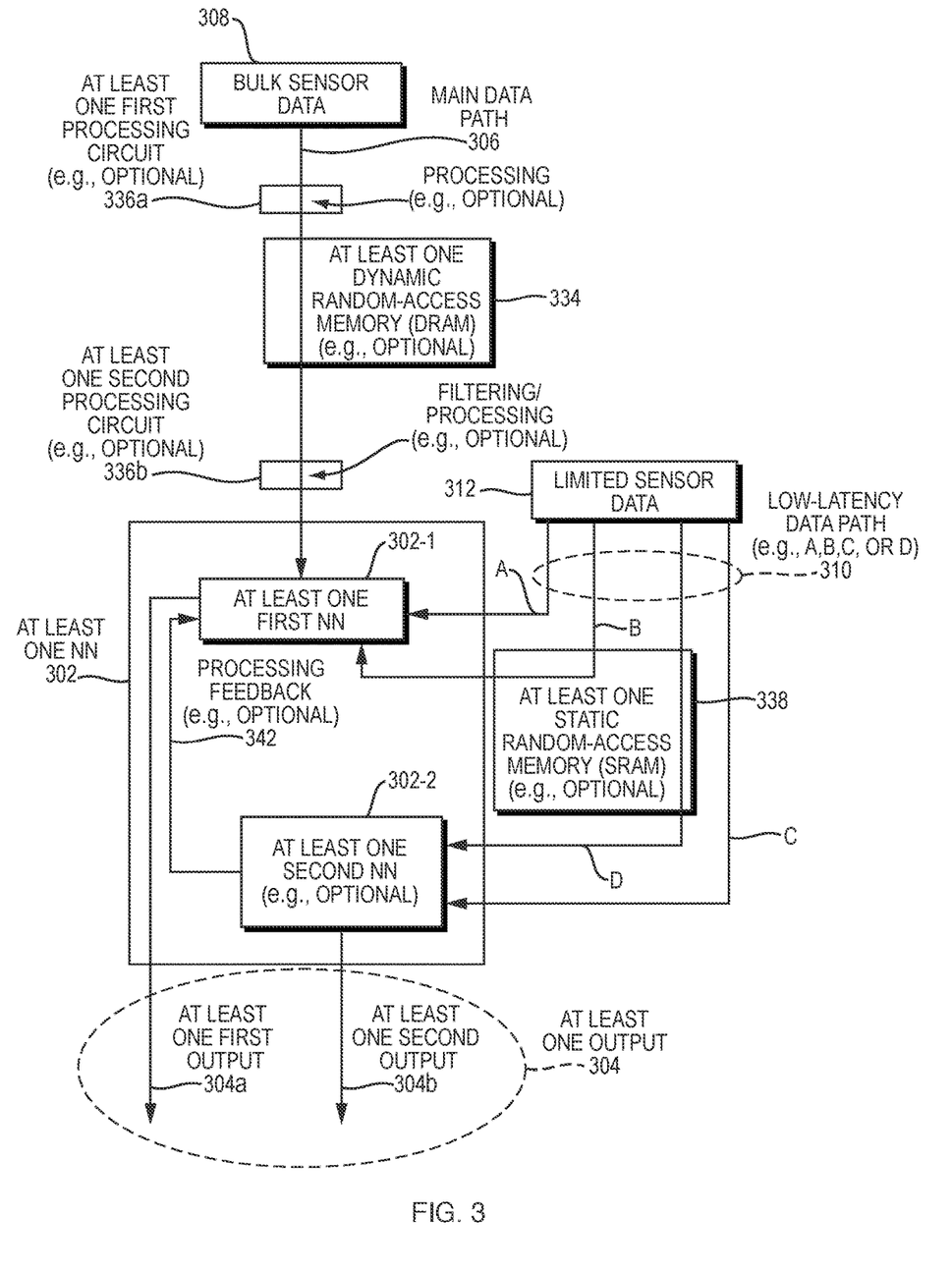
FIG. 3 is a block diagram of an example embodiment of a main data path and low-latency data path.

FIG. 3 is a block diagram of an example embodiment of a main data path 306 and low-latency data path 310 that may be employed as the main data path 106, 206 and low-latency data path 110, 210, respectively, disclosed above with regard to FIGS. 1A-B and 2. The main data path 306 may be considered to be a "main" data path as it may be configured to transport a majority of sensor data (e.g., the bulk sensor data 308) of all sensor data provided to the at least one NN 302 for processing. According to the example embodiment of FIG. 3, the main data path 306 includes at least one DRAM 334 configured to store the bulk sensor data 308 before the bulk sensor data 308 is routed to the at least one NN 302. The at least one NN 302 may be employed as the at least one NN 102, 202, disclosed above with regard to FIGS. 1A-B and 2.

The main data path 306 may further include, optionally, at least one first processing circuit 336a. The at least one first processing circuit 336a is configured to process the bulk sensor data 308 before the bulk sensor data 308 is stored in the at least one DRAM 334.

The main data path 306 may further include, optionally, at least one second processing circuit 336b. The at least one second processing circuit 336b is disposed between the at least one DRAM 334 and the at least one NN 302. The at least one second processing circuit 336b may be configured to process the bulk sensor data 308, filter the bulk sensor data 308, or a combination thereof, before the bulk sensor data 308 (that may have already been processed by the at least one first processing circuit 336a) is routed from the at least one DRAM 334 to the at least one NN 302.

According to an example embodiment, the limited sensor data 312 may be employed by the at least one NN 302 to adjust at least one filter of the at least one second processing circuit 336b to adjust priority of the bulk sensor data 308. The at least one filter may include any filter known in the art, such as a comb filter or other filter.

The low-latency data path 310 may include, optionally, at least one static random-access memory (SRAM) 338 configured to store the limited sensor data 312 before the limited sensor data 312 is routed to the at least one NN 302. It should be understood that the at least one SRAM 338 is not limited to being an SRAM chip(s) and may be implemented in a variety of ways. For example, according to a non-limiting example embodiment, the at least one SRAM 338 may be implemented via multiple flip-flops (FFs) or other SRAM logic/circuit(s) integrated together with the at least one NN 302 on an application-specific integrated circuit (ASIC), whereas the at least one DRAM 334 may be separate from and external to the ASIC.

According to an example embodiment, the at least one NN 302 may include at least one first NN 302-1 and at least one second NN 302-2. The at least one second NN 302-2 may be smaller and may execute faster relative to the at least one first NN 302-1. For example, the at least one second NN 302-2 may include less nodes, connections, layers, weights, etc. relative to the at least one first NN 302-1.

According to an example embodiment, the low-latency data path 310 may be configured to route the limited sensor data 312 to the at least one NN 302 by routing the limited sensor data 312 to the at least one first NN 302-1, directly, that is, via route A. Alternatively, the low-latency data path 310 may be configured to route the limited sensor data 312 to the at least one NN 302 via route B that is configured to store the limited sensor data 312 in the at least one SRAM 338 before the limited sensor data 312 is routed to the at least one first NN 302-1 of the at least one NN 302.

According to an example embodiment, the low-latency data path 310 may be configured to route the limited sensor data 312 to the at least one NN 302 by routing the limited sensor data 312 to the at least one second NN 302-2, directly, that is, via route "C." Alternatively, the low-latency data path 310 may be configured to route the limited sensor data 312 to the at least one NN 302 via route D that is configured to store the limited sensor data 312 in the at least one SRAM 338 before the limited sensor data 312 is routed to the at least one second NN 302-2 of the at least one NN 302.

According to an example embodiment, an output layer (not shown) of the at least one second NN 302-2 may be coupled to an input layer (not shown) of the at least one first NN 302-1 to provide processing feedback 342 from the output layer of the at least one second NN 302-2 to the input layer of the at least one first NN 302-1.

Regardless of which route, A, B, C, or D, or combination thereof, the low-latency data path 310 employs, the low-latency data path 310 routes the limited sensor data 312 to the at least one NN 302 which is configured to, in turn, employ the limited sensor data 312 to improve performance of the at least one NN's processing of the bulk sensor data 308 for generating the at least one output 304. The at least one output 304 may include the at least one first output 304a that is generated by the at least one first NN 302-1. The at least one output 304 may further include the at least one second output 304b that is generated by the at least one second NN 302-2.

According to an example embodiment, the at least one second NN 302-2 may be configured to generate the at least one second output 304b that may be used for controlling the autonomous driving or to effect a change to at least one parameter (not shown) that controls at least one sensor that sources at least a portion of the bulk sensor data 308, such as the at least one sensor 224 of FIG. 2, disclosed above.

As disclosed further above, the at least one NN 302 may comprise a plurality of neural networks (NNs). The fast input data, that is, the limited sensor data 312, may be provided to the plurality of NNs, to a given NN of the plurality of NNs, or to another system (not shown) of NNs that are working in a unified manner.

Figure 4:
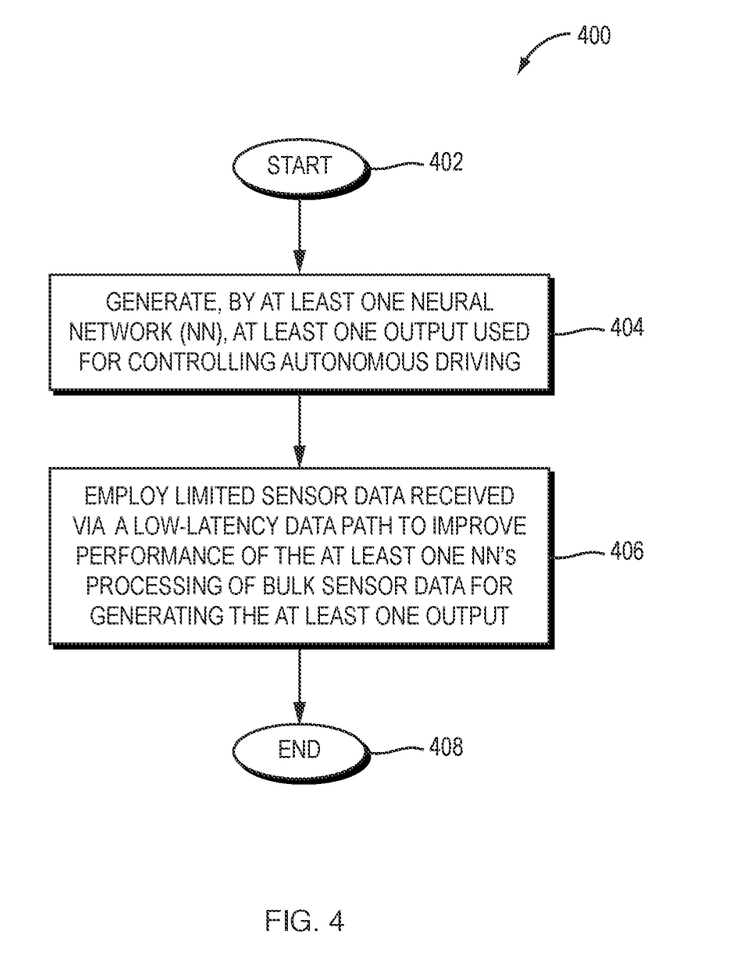
FIG. 4 is a flow diagram of an example embodiment of a method for autonomous driving.

FIG. 4 is a flow diagram 400 of an example embodiment of a method for autonomous driving. The method begins (402) and generates, by at least one neural network (NN), at least one output used for controlling the autonomous driving (404). The method employs limited sensor data received via a low-latency data path to improve performance of the at least one NN's processing of bulk sensor data for generating the at least one output, the bulk sensor data routed to the at least one NN via a main data path, the limited sensor data routed to the at least one NN via the low-latency data path with reduced latency relative to the main data path (406). The method thereafter ends (408) in the example embodiment.

Employing the limited sensor data, such as the limited sensor data 112, 212, 312, disclosed above, enables the at least one NN, such as the at least one NN 102, 202, 302, disclosed above, to generate the at least one output, such as the at least one output 104, 204, 304, sooner or with improved accuracy relative to generating the at least one output based on processing the bulk sensor data, such as the bulk sensor data 108, 208, 308, disclosed above, without processing the limited sensor data received via the low-latency data path, such as the low-latency data path 110, 210, 310, disclosed above, ahead of the bulk sensor data.

The method may further comprise sourcing, by at least one sensor, such as the at least one sensor 224 of FIG. 2, disclosed above, radar data, lidar data, image data, audio data, tactile data, or a combination thereof, related to an environment of a vehicle, such as the environment 90 of the autonomous vehicle 95 of FIB. 1A, disclosed above, the vehicle controlled by the autonomous driving, the limited sensor data including the radar data, lidar data, image data, audio data, tactile data, or a combination thereof.

The method may further comprise sourcing at least a portion of the bulk sensor data, limited sensor data, or a combination thereof, by a radar sensor, lidar sensor, sonar sensor, ultrasonic transducer, camera, infrared sensor, pitch sensor, roll sensor, yaw sensor, altitude sensor, heading sensor, positioning system, such as a GPS but not limited thereto, accelerometer, velocity sensor, microphone, or a combination thereof.

The at least one NN may be included in an inference engine coupled to a decision-making engine, such as the inference engine 228 coupled to the decision-making engine 232 of FIG. 2, disclosed above, and the method may further comprise outputting the at least one output from the at least one NN of the inference engine to the decision-making engine. The method may further comprise, at the decision-making engine, making at least one decision for controlling the autonomous driving based on the at least one output generated.

The main data path may include at least one dynamic random-access memory (DRAM), such as the at least one DRAM 334 of FIG. 3, disclosed above, and the method may further comprise storing the bulk sensor data in the at least one DRAM before routing the bulk sensor data to the at least one NN. The main data path may further include at least one processing circuit, such as the first processing circuit 336a, and the method may further comprise processing the bulk sensor data by the at least one processing circuit before storing the bulk sensor data in the at least one DRAM.

The at least one processing circuit may be the at least one first processing circuit, the main data path may further include at least one second processing circuit disposed between the at least one DRAM and at least one NN, such as the at least one second processing circuit 336b of FIG. 3, disclosed above, and the method may further comprise processing the bulk sensor data, filtering the bulk sensor data, or a combination thereof, at the least one second processing circuit, before routing the bulk sensor data from the at least one DRAM to the at least one NN.

The low-latency data path may include at least one static random-access memory (SRAM), such as the at least one SRAM 338 of FIG. 3, disclosed above, and the method may further comprise storing the limited sensor data in the SRAM before routing the limited sensor data to the at least one NN.

The at least one NN may include at least one first NN and at least one second NN, such as the at least one first NN 302-1 and at least one second NN 302-2 of FIG. 3, disclosed above, and the method may further comprise routing the bulk sensor data to the at least one first NN via the main data path and routing the limited sensor data to the at least one second NN via the low-latency data path. The low-latency data path may include the at least one SRAM and the method may further comprises storing the limited sensor data in the at least one SRAM before routing the limited sensor data to the at least one second NN. An output layer of the at least one second NN may be coupled to an input layer of the at least one first NN and the method may further comprise providing processing feedback from the output layer of the at least one second NN to the input layer of the at least one first NN.

The at least one output may include at least one first output and at least one second output, such as the at least one first output 304a and at least one second output 304b of FIG. 3, disclosed above. The method may further comprise generating the at least one first output by the at least one first NN and generating the at least one second output by the at least one second NN. The at least one second NN may be used for controlling the autonomous driving or to effect a change to at least one parameter that controls at least one sensor sourcing at least a portion of the bulk sensor data.

Figure 5:
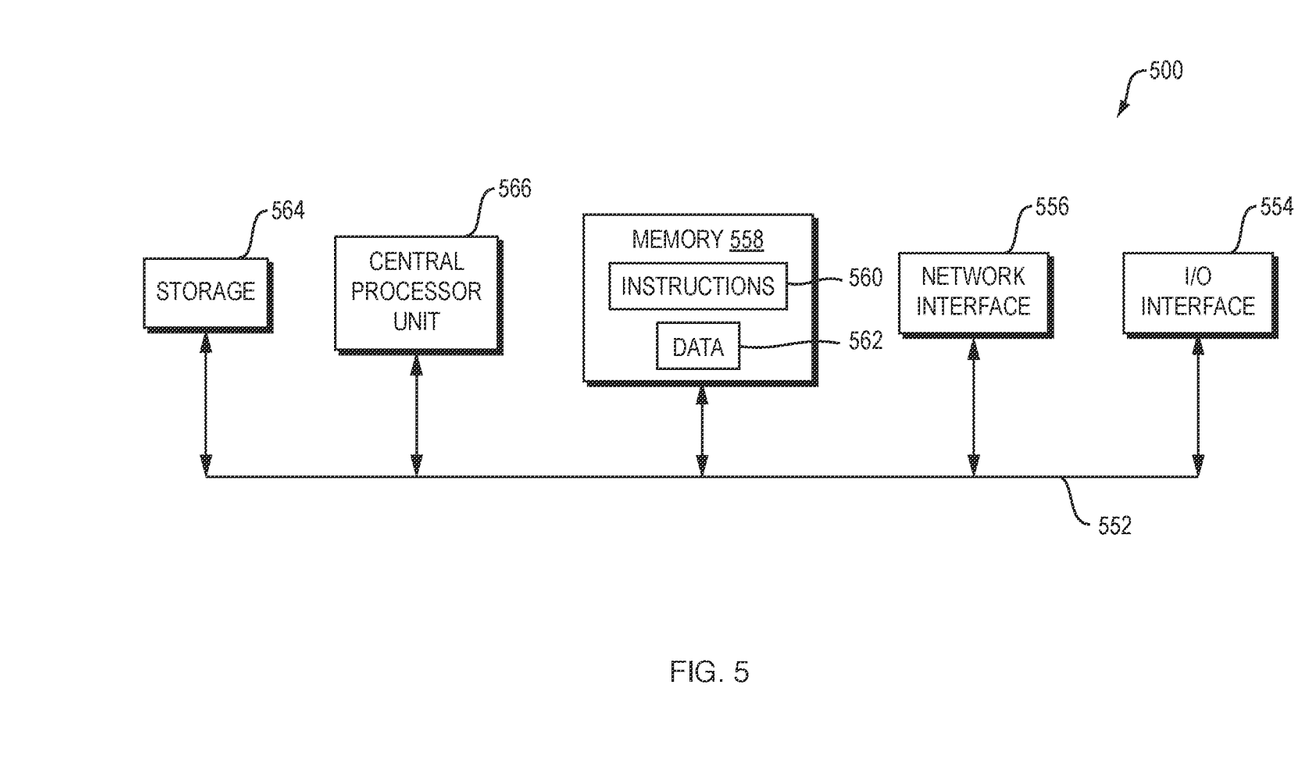
FIG. 5 is a block diagram of an example internal structure of a computer optionally within an embodiment disclosed herein.

FIG. 5 is a block diagram of an example of the internal structure of a computer 500 in which various embodiments of the present disclosure may be implemented. The computer 500 contains a system bus 552, where a bus is a set of hardware lines used for data transfer among the components of a computer or digital processing system. The system bus 552 is essentially a shared conduit that connects different elements of a computer system (e.g., processor, disk storage, memory, input/output ports, network ports, etc.) that enables the transfer of information between the elements. Coupled to the system bus 552 is an I/O device interface 554 for connecting various input and output devices (e.g., keyboard, mouse, displays, printers, speakers, etc.) to the computer 500. A network interface 556 allows the computer 500 to connect to various other devices attached to a network (e.g., global computer network, wide area network, local area network, etc.). Memory 558 provides volatile or non-volatile storage for computer software instructions 560 and data 562 that may be used to implement embodiments of the present disclosure, where the volatile and non-volatile memories are examples of non-transitory media. Disk storage 564 provides non-volatile storage for computer software instructions 560 and data 562 that may be used to implement embodiments of the present disclosure. A central processor unit 566 is also coupled to the system bus 552 and provides for the execution of computer instructions.

As used herein, the term "engine" may refer to any hardware, software, firmware, electronic control component, processing logic, and/or processor device, individually or in any combination, including without limitation: an application-specific integrated circuit (ASIC), a field-programmable gate array (FPGA), an electronic circuit, a processor and memory that executes one or more software or firmware programs, and/or other suitable components that provide the described functionality.

Example embodiments disclosed herein may be configured using a computer program product; for example, controls may be programmed in software for implementing example embodiments. Further example embodiments may include a non-transitory computer-readable medium containing instructions that may be executed by a processor, and, when loaded and executed, cause the processor to complete methods described herein. It should be understood that elements of the block and flow diagrams may be implemented in software or hardware, such as via one or more arrangements of circuitry of FIG. 5, disclosed above, or equivalents thereof, firmware, a combination thereof, or other similar implementation determined in the future.

In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random-access memory (RAM), read only memory (ROM), compact disk read-only memory (CD-ROM), and so forth. In operation, a general purpose or application-specific processor or processing core loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments disclosed herein.

While example embodiments have been particularly shown and described, it will be understood by those skilled in the art that various changes in form and details may be made therein without departing from the scope of the embodiments encompassed by the appended claims.

What is claimed is:

1. A system for autonomous driving, the system comprising:
   at least one neural network (NN);
   a main data path configured to route bulk sensor data to the at least one NN; and
   a low-latency data path with reduced latency relative to the main data path, the low-latency data path configured to route limited sensor data to the at least one NN, the at least one NN configured to generate, by a processor, at least one output based on the bulk sensor data and limited sensor data, the at least one output used to control the autonomous driving.

2. The system of claim 1, wherein the limited sensor data is of a lesser amount relative to the bulk sensor data, coarser relative to the bulk sensor data, or a combination thereof.

3. The system of claim 1, wherein the limited sensor data enables the at least one NN to generate the at least one output sooner or with improved accuracy relative to generating the at least one output based on processing the bulk sensor data without processing the limited sensor data received via the low-latency data path ahead of the bulk sensor data.

4. The system of claim 1, wherein the limited sensor data includes radio detection and ranging (radar) data, light detection and ranging (lidar) data, image data, audio data, tactile data, or a combination thereof, sourced by at least one sensor and related to an environment of a vehicle, the vehicle controlled by the autonomous driving.

5. The system of claim 1, wherein at least a portion of the bulk sensor data, limited sensor data, or a combination thereof, is sourced by a radar sensor, lidar sensor, sound navigation and ranging (SONAR) sensor, ultrasonic transducer, camera, infrared sensor, pitch sensor, roll sensor, yaw sensor, altitude sensor, heading sensor, positioning system, accelerometer, velocity sensor, microphone, or a combination thereof.

6. The system of claim 1, wherein the system further comprises an inference engine and a decision-making engine, wherein the inference engine includes the at least one NN, and wherein the at least one output is output from the at least one NN of the inference engine to the decision-making engine.

7. The system of claim 6, wherein the decision-making engine is configured to make at least one decision for controlling the autonomous driving based on the at least one output generated.

8. The system of claim 1, wherein the main data path includes at least one dynamic random-access memory (DRAM) configured to store the bulk sensor data before the bulk sensor data is routed to the at least one NN.

9. The system of claim 8, wherein the main data path further includes at least one processing circuit configured to process the bulk sensor data before the bulk sensor data is stored in the at least one DRAM.

10. The system of claim 9, wherein the at least one processing circuit is at least one first processing circuit, wherein the main data path further includes at least one second processing circuit, the at least one second processing circuit disposed between the at least one DRAM and the at least one NN, the at least one second processing circuit configured to process the bulk sensor data, filter the bulk sensor data, or a combination thereof, before the bulk sensor data is routed from the at least one DRAM to the at least one NN.

11. The system of claim 1, wherein the low-latency data path includes at least one static random-access memory (SRAM) configured to store the limited sensor data before the limited sensor data is routed to the at least one NN.

12. The system of claim 1, wherein the at least one NN includes at least one first NN and at least one second NN, wherein the main data path is configured to route the bulk sensor data to the at least one first NN and wherein the low-latency data path is configured to route the limited sensor data to the at least one second NN.

13. The system of claim 12, wherein the at least one second NN is smaller and executes faster relative to the at least one first NN.

14. The system of claim 12, wherein the low-latency data path includes at least one SRAM configured to store the limited sensor data before the limited sensor data is routed to the at least one second NN.

15. The system of claim 12, wherein an output layer of the at least one second NN is coupled to an input layer of the at least one first NN to provide processing feedback from the output layer of the at least one second NN to the input layer of the at least one first NN.

16. The system of claim 12, wherein the at least one output includes at least one first output and at least one second output, the at least one first NN configured to generate the at least one first output, the at least one second NN configured to generate the at least one second output, the at least one second output used for controlling the autonomous driving or to effect a change to at least one parameter that controls at least one sensor sourcing at least a portion of the bulk sensor data.

17. A method for autonomous driving, the method comprising:
- routing bulk sensor data to at least one neural network (NN) via a main data path;
- routing limited sensor data to the at least one NN via a low-latency data path with reduced latency relative to the main data path; and
- generating, by the at least one NN via a processor, at least one output based on employing the bulk sensor data and limited sensor data, the at least one output used for controlling the autonomous driving.

18. The method of claim 17, wherein the limited sensor data is of a lesser amount relative to the bulk sensor data, coarser relative to the bulk sensor data, or a combination thereof.

19. The method of claim 17, wherein employing the limited sensor data enables the at least one NN to generate the at least one output sooner or with improved accuracy relative to generating the at least one output based on processing the bulk sensor data without processing the limited sensor data received via the low-latency data path ahead of the bulk sensor data.

20. The method of claim 17, further comprising sourcing, by at least one sensor, radio detection and ranging (radar) data, light detection and ranging (lidar) data, image data, audio data, tactile data, or a combination thereof, related to an environment of a vehicle, the vehicle controlled by the autonomous driving, the limited sensor data including the radar data, lidar data, image data, audio data, tactile data, or a combination thereof.

21. The method of claim 17, further comprising sourcing at least a portion of the bulk sensor data, limited sensor data, or a combination thereof, by a radar sensor, lidar sensor, sound navigation and ranging (SONAR) sensor, ultrasonic transducer, camera, infrared sensor, pitch sensor, roll sensor, yaw sensor, altitude sensor, heading sensor, positioning system, accelerometer, velocity sensor, microphone, or a combination thereof.

22. The method of claim 17, wherein the at least one NN is included in an inference engine coupled to a decision-making engine and wherein the method further comprises outputting the at least one output from the at least one NN of the inference engine to the decision-making engine.

23. The method of claim 22, further comprises, at the decision-making engine, making at least one decision for controlling the autonomous driving based on the at least one output generated.

24. The method of claim 17, wherein the main data path includes at least one dynamic random-access memory (DRAM) and wherein the method further comprises storing the bulk sensor data in the at least one DRAM before routing the bulk sensor data to the at least one NN.

25. The method of claim 24, wherein the main data path further includes at least one processing circuit and wherein the method further comprises processing the bulk sensor data by the at least one processing circuit before storing the bulk sensor data in the at least one DRAM.

26. The method of claim 25, wherein the at least one processing circuit is at least one first processing circuit, wherein the main data path further includes at least one second processing circuit, the at least one second processing circuit disposed between the at least one DRAM and at least one NN, and wherein the method further comprises processing the bulk sensor data, filtering the bulk sensor data, or a combination thereof, at the least one second processing circuit, before routing the bulk sensor data from the at least one DRAM to the at least one NN.

27. The method of claim 17, wherein the low-latency data path includes at least one static random-access memory (SRAM) and wherein the method further comprises storing the limited sensor data in the SRAM before routing the limited sensor data to the at least one NN.

28. The method of claim 17, wherein the at least one NN includes at least one first NN and at least one second NN, and wherein the method further comprises routing the bulk sensor data to the at least one first NN via the main data path and routing the limited sensor data to the at least one second NN via the low-latency data path.

29. The method of claim 28, wherein the at least one second NN is smaller and executes faster relative to the at least one first NN.

30. The method of claim 28, wherein the low-latency data path includes at least one SRAM and wherein the method further comprises storing the limited sensor data in the at least one SRAM before routing the limited sensor data to the at least one second NN.

31. The method of claim 28, wherein an output layer of the at least one second NN is coupled to an input layer of the at least one first NN and wherein the method further comprises providing processing feedback from the output layer of at least one second NN to the input layer of the at least one first NN.

32. The method of claim 28, wherein the at least one output includes at least one first output and at least one second output and wherein the method further includes generating the at least one first output by the at least one first NN and generating the at least one second output by the at least one second NN, the at least one second output used for controlling the autonomous driving or to effect a change to at least one parameter that controls at least one sensor sourcing at least a portion of the bulk sensor data.

33. A system for autonomous driving, the system comprising:
- means for routing bulk sensor data for neural network processing;
- means for routing limited sensor data for the neural network processing with reduced latency relative to the routing of the bulk sensor data; and
- means for generating, via the neural network processing, at least one output based on the bulk sensor data and limited sensor data, the at least one output used to control the autonomous driving.

* * * * *